Jan. 5, 1943.  J. J. SCHLUMBRECHT ET AL  2,307,644
HYDRAULIC PRESSURE LOCK AND BOOSTER
Filed Nov. 21, 1941   2 Sheets-Sheet 1
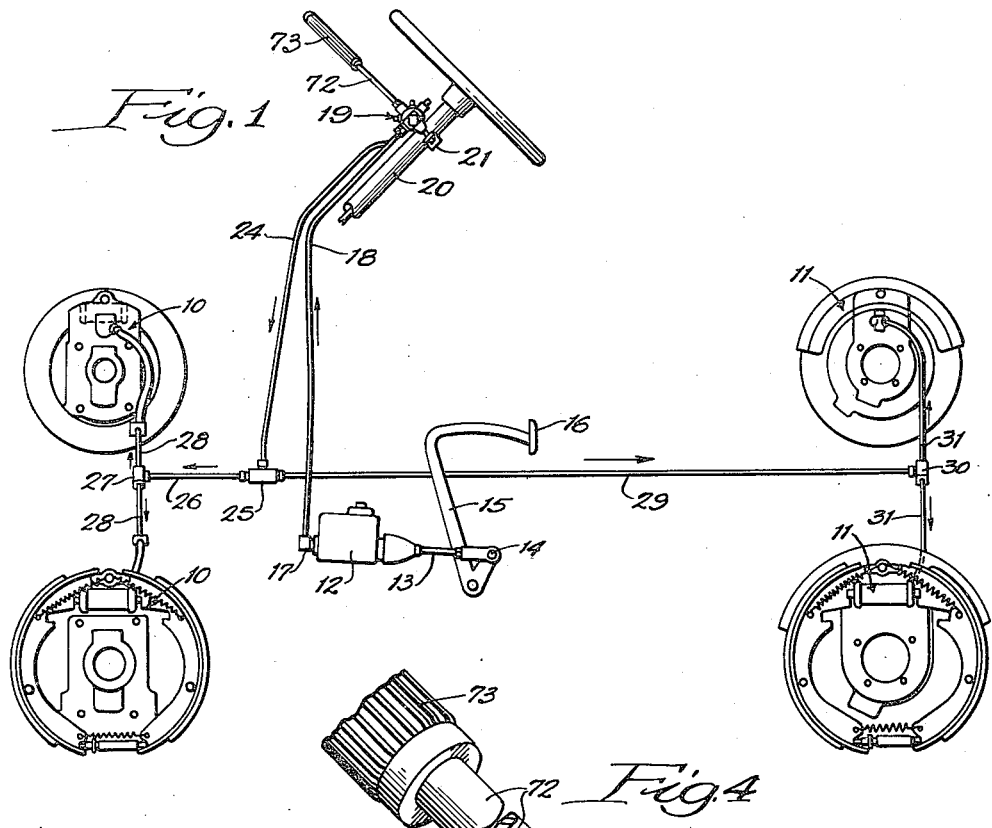
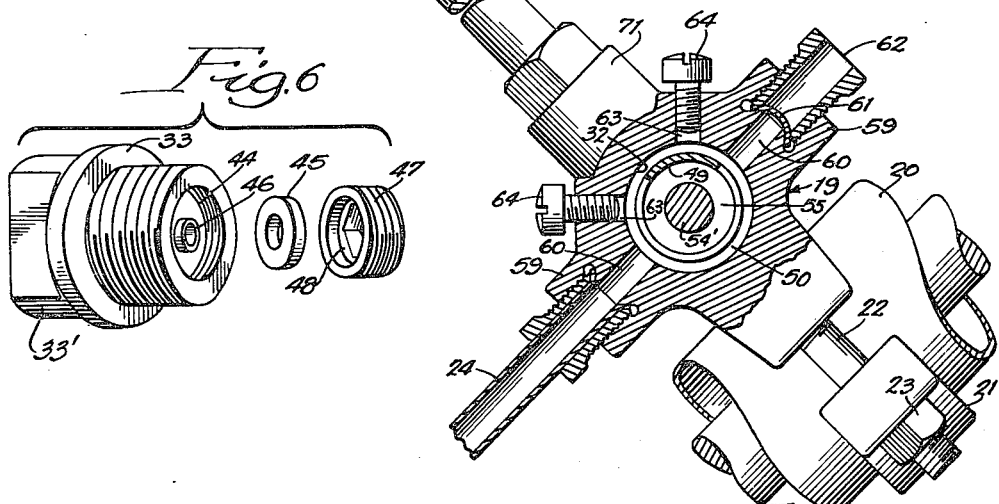
Inventors:
John J. Schlumbrecht
and John E. Allen.
By Soans, Pond & Anderson,
Attorneys.

Jan. 5, 1943.   J. J. SCHLUMBRECHT ET AL   2,307,644
HYDRAULIC PRESSURE LOCK AND BOOSTER
Filed Nov. 21, 1941   2 Sheets-Sheet 2
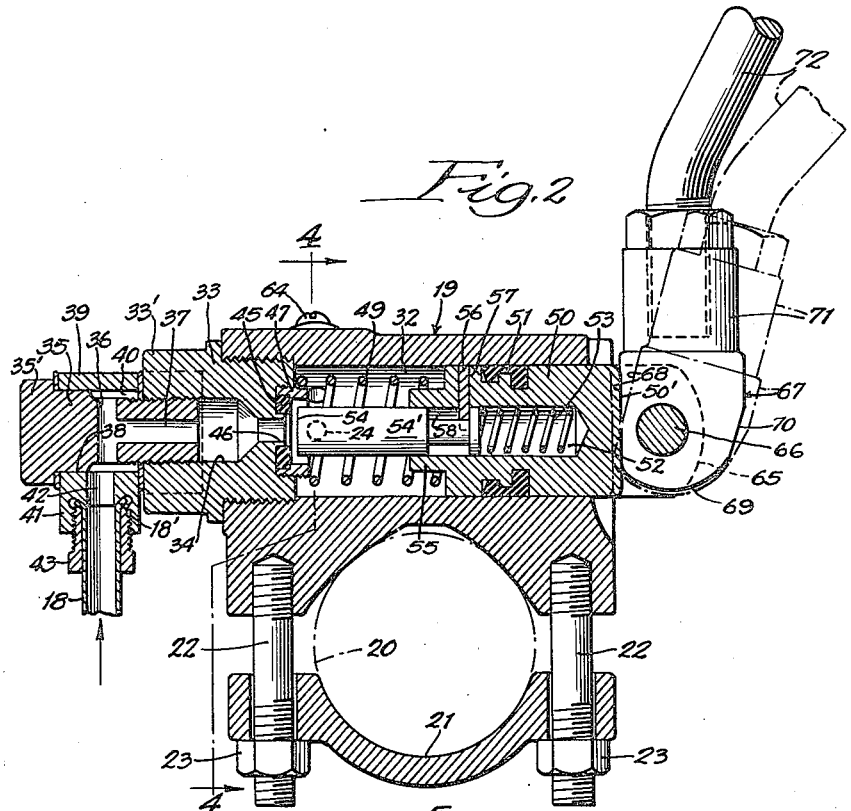
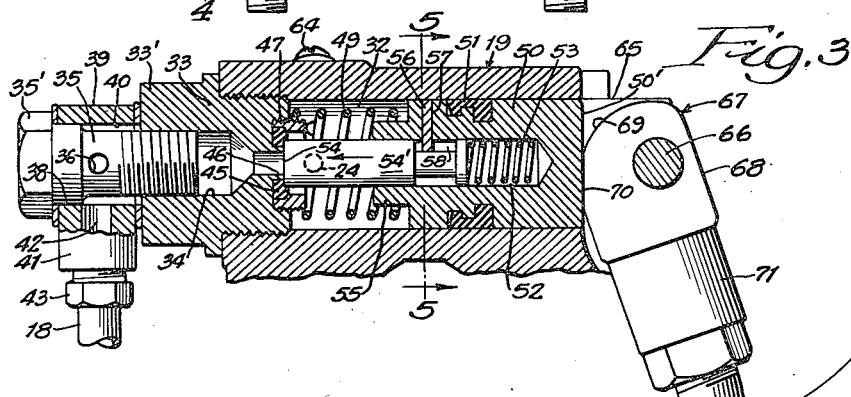
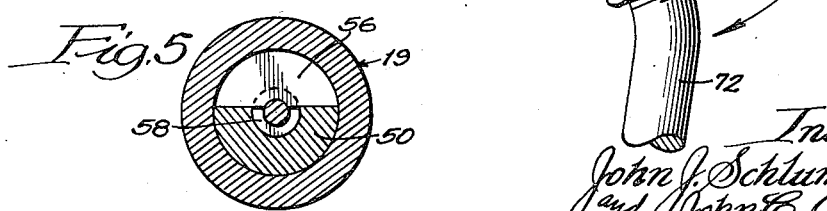

Patented Jan. 5, 1943

2,307,644

UNITED STATES PATENT OFFICE 2,307,644

HYDRAULIC PRESSURE LOCK AND BOOSTER

John J. Schlumbrecht and John C. Allen, Chicago, Ill.; said Schlumbrecht assignor to Calumet Machine Co., a corporation of Illinois Application November 21, 1941, Serial No. 419,938

4 Claims. (Cl. 188—152)

This invention relates to systems for creating and applying hydraulic pressures. It has been designed more particularly, although not exclusively, for the hydraulic brakes used on automobiles and other motor vehicles, such as trucks.

A known hydraulic brake system for automobiles and trucks comprises what is known as a master cylinder, the plunger of which is connected to and operated by the brake pedal lever to force a fluid under pressure from the master cylinder through distributing lines to the wheel brakes. In order to hold and lock the applied pressure at the brakes it has been the practice to interpose in the main line from the discharge end of the master cylinder a check valve that opens on the forcing stroke of the master cylinder plunger and automatically reseats itself under the back pressure from the brakes, or a spring, or both. When the pressure in the brakes is to be released so that the vehicle can be restarted, or for other reasons, the check valve is unseated which takes the pressure of the fluid off the brakes. In some cases this has been done by a rotatable cam operating on the stem of the check valve and itself operated by the driver through an arm and cord connection from the cam shaft to the dash of the vehicle. In other cases the arm and cord connection has been connected to and operated by the lever of the clutch pedal.

Our present invention relates in part to improvements in the check valve and its operating means. According to our invention the check valve is normally open, and it is closed, to hold the pressure in the brakes, by a manually operated device that is associated with the casing of the check valve, and said casing is itself mounted on the steering post of the vehicle just below the steering wheel. The check valve when closed is held closed by an element of the manually operated device, and it is reopened by a spring when said element is moved to another position.

It sometimes happens that when the heavily loaded vehicle is stopped on a steep grade, the original pressure transmitted to the brakes from the master cylinder is insufficient to hold the vehicle from moving down the grade. It has been proposed to remedy this by a second stroke of the plunger of the master cylinder; but this is a difficult operation because the leverage of the brake pedal lever is so small and the original fluid pressure on the brakes is so high that a very powerful leg stroke is required of the driver to boost the pressure. Our invention, in its preferred form hereinafter described in detail, includes a pressure booster that is mounted in the check valve casing and uses the manually operated elements of the check valve closing means to also operate a plunger in the fluid chamber of the check valve casing that boosts the pressure in the line leading from said chamber to the brakes and locks said pressure until released by a reverse movement of said manually operated elements. The leverage of said manually operated elements is so high that the boosting operation is easily performed by the hand and arm of the driver.

A practical and preferred embodiment of the invention is illustrated in the accompanying drawings, in which—

Fig. 1 is a diagrammatic view in perspective, showing the manner of applying the invention to a motor vehicle equipped with hydraulic brakes;

Fig. 2 is a longitudinal section through the check valve casing and its associated parts, showing the check valve in normal open position, and also showing in dot and dash lines a position of the hand lever and cam when the check valve has been closed but before the pressure booster plunger has been fully operated to boost the pressure on the brakes; this view also showing a clamp for mounting the device on the steering post;

Fig. 3 is a view similar to Fig. 2, omitting the clamp, and showing the parts in their positions when the pressure has been boosted and locked;

Fig. 4 is a cross-section on the line 4—4 of Fig. 2;

Fig. 5 is a cross-section on the line 5—5 of Fig. 3; and

Fig. 6 is a group view showing in perspective the parts, disassembled, making up the check valve seat and the centering mandrel of the thrust spring.

In Fig. 1 there is diagrammatically shown an hydraulic brake system embodying the present invention, wherein 10 designates as an entirety the brakes of the front wheels of a motor vehicle and 11 designates as an entirety the brakes of the rear wheels of the vehicle. Suitably mounted on the chassis is a master cylinder 12 containing a plunger the stem 13 of which is pivotally connected at 14 to the operating lever 15 of the brake pedal 16. From the discharge end 17 of the master cylinder 12 a pipe line 18 leads upwardly to and is connected into one end of a check valve casing 19 that, as shown in Figs. 1, 2 and 4, is adjustably and detachably mounted on the steering post 20 of the vehicle as by a clamp 21 and bolts and nuts 22 and 23. 24 designates a pipe line leading from the interior of the casing 19, and at its lower end connected into a T coupling 25. From one end of the coupling 25 extends a pipe line 26 connecting into another T coupling 27, from which latter pipe and hose lines 28 extend to the brakes 10 of the front wheels. From the other end of the T coupling 25 extends a pipe line 29 that connects into another T coupling 30, from which latter extend pipe lines 31 leading to the brakes 11 of the rear wheels.

The structural details of the casing 19 and the parts mounted therein are shown in Figs. 2 to 6 inclusive, from which it will be seen that the casing contains a cylindrical fluid-receiving chamber 32 extending from end to end thereof. One end of this chamber is tapped to receive a cylinder head 33, and the latter has an axial bore 34, the outer portion of which is also tapped to receive the threaded inner end of a plug 35 that screws into the bore 34 of the head 33. The plug 35 is formed with a transverse duct 36 and with an axial duct 37 leading from the duct 36 through the inner end of the plug. The plug 35 is formed with an annular shoulder 38 of slightly greater diameter than the bored portion of the plug and integral with the shouldered portion is a polygonal head 35' adapted to receive a wrench. The outer end 33' of the cylinder head 33 is also flattened on opposite sides to form a wrench hold.

Encircling the portion of the plug 35 between its head 35' and the outer end 33' of head 33 is a coupling block 39 formed with a circular bore that encircles and rests on the shoulder 38 of the plug 35. This forms an annular space 40 that encircles and communicates with the transverse duct 36 of the plug 35. On the lower side of the block 39 is a boss 41 formed with a central duct 42 that registers with the upper end of the flow pipe 18 from the master cylinder, said upper end being secured in a leak-proof manner by a gland 43 screwed into the boss 41 and bearing against an outwardly swaged end 18' of the pipe 18. The inner end of the duct 42 communicates with the annular space 40 in the block 39.

The bore 34 of the head 33 extends entirely through the head, but its inner portion is of reduced diameter, as shown. The inner face of the head 33 is formed with a shallow internally threaded recess 44 (Fig. 6) that seats an annular rubber packing 45, said packing encircling a short, hollow nipple 46 on the bottom of the recess 44 through which the reduced portion of the bore 34 extends. Screwed into the recess 44 is a ring 47 (Fig. 6) that is formed on its outer side with an annular counter-sink 48 that encircles and compresses the peripheral portion of the packing 45 and locks it in place in the manner clearly shown in Figs. 2 and 3. The inner side of the ring 47 projects a slight distance beyond the inner face of the head 33 and forms a centering mandrel for the outer end of a thrust spring 49, later referred to.

Slidable in the chamber 32 is a plunger 50 that has a squared outer end 50' and is equipped with a rubber packing or sealing ring 51 that prevents the leakage of fluid between the plunger and the cylinder wall through which it moves. This plunger is formed with an axial bore 52 closed at its outer end and containing a thrust spring 53. The inner end of the spring 53 abuts against the outer end of the stem 54' of the check valve 54, said stem being also slidable in the bore 52. The inner end of the thrust spring 49, before referred to, abuts against the inner end of the plunger 50, encircling a spring centering mandrel 55 on the inner face of the plunger, so that the spring 49, which is always under tension, constantly urges the plunger 50 outwardly. There is a limited lost motion connection between the plunger 50 and the valve stem 54'. This is formed by a flat segment-shaped key 56 (Fig. 5) mounted in a transverse slot 57 in the plunger and extending into an annular groove 58 in the valve stem 54', which groove is of substantially greater width than the thickness of the key 56, so that the plunger 50 can move inwardly after the check valve 54 has been seated, as is shown in Fig. 3.

Referring to Fig. 4, at opposite points on the casing 19 are radial bosses 59 formed with ducts 60 that communicate with the chamber 32. Into one of these bosses is connected the upper end of the flow pipe 24 in the same manner that the flow pipe 18 is connected into the boss 41 of the block 39. The other duct 60 is sealed by a sealing cap 61 and a gland 62. Thus, if desired, the flow from the chamber 32 to the brakes may be through a pair of pipes 24, or a single pipe may be used as illustrated in Figs. 1 and 4. The casing 19 is also equipped with a pair of holes 63 communicating with the chamber 32 for the purpose of venting the system of air when filling it with liquid, the holes 63 being normally closed by screw plugs 64.

Coming now to the manually operated means for first closing the check valve 54 and then, if desired, forcing the plunger 50 inwardly to boost the hydraulic pressure, one end of the casing 19 terminates in a forked lug 65, through which extends a pivot pin 66. Mounted on this pivot pin is a cam designated as an entirety by 67. This cam has a flat face 68, continuous with one end of the face 68 an involute cam face 69, and continuous with the latter a flat face 70 that is opposite the flat front face 68. Fitted into the shank 71 of the cam is a hand lever 72 that terminates at its free end in a hand grip 73.

In operation, with the entire system filled with fluid, the hand lever 72 normally stands in the upright position shown in Fig. 1 and by full lines in Fig. 2, where the flat side 68 of the cam squarely abuts against the squared end 50' of the plunger 50. After the driver has set the brakes by manipulation of the brake pedal 16, he locks the brakes in set position by a slight downward swing of the hand lever 72 substantially to the position indicated by dot-and-dash lines in Fig. 2. This forces the plunger 50 a slight distance inwardly sufficient to close the check valve through pressure exerted by the spring 53 on the stem of the check valve; it being here noted that spring 53 is lighter than spring 49. The weight of the handle is sufficient to hold the check valve closed against the thrusts of the springs 49 and 53 and the back pressure of the fluid in the brakes. If, now, the driver finds that the hydraulic pressure applied through the brake pedal is insufficient to hold the vehicle against movement, he swings the hand lever 72 clear down to the lowered position illustrated in Fig. 3. This, through the cam surface 69, forces the plunger 50 inwardly, thus boosting the pressure of the fluid in the chamber 32 and in the pipe lines leading therefrom to the brakes, at the same time further compressing the spring 53 and thus increasing the pressure on the closed check valve 54. The rubber seat 45 of the check valve is very effective to maintain a leak-tight closure of the latter. The parts are all restored to a normal position when starting the vehicle again in movement by a simple full upswing of the hand lever 72 from the Fig. 3 position to the full line position in Fig. 2.

Only a small inward movement of the plunger 50—a small fraction of an inch—suffices to practically double the pressure on the brakes, and the enormous leverage afforded by the hand lever and the cam enables this movement to be made with ease by the hand and arm of the driver. When the hand lever is fully raised, the spring 49 backs the plunger to the Fig. 2 position, and the key 56 retracts the check valve 54 from its seat to about the extent indicated in Fig. 2.

While the invention has been illustrated as a brake for motor vehicles, it is obvious that the principles thereof are readily applicable to hydraulic braking systems for any purpose, and it is therefore to be understood that the invention is not limited, except as otherwise indicated in the claims, to braking systems of motor vehicles.

Variations and modifications in the structural details of the device may be resorted to within the scope and coverage of the appended claims.

We claim:

1. In a hydraulic pressure system of the class described, wherein, through a master cylinder and a plunger therein, a fluid is forced under pressure to a point of application, a device for locking and releasing the pressure at the point of application, and for boosting the applied pressure when required, comprising a casing containing a fluid receiving chamber, a flow line leoding into said chamber from the master cylinder, a valve seat in said chamber at the entrance end of said flow line, a flow line leading from said chamber to the point of application, a plunger slidable in said chamber, resilient means urging said plunger outwardly, a check valve cooperating with said valve seat and having a stem slidably mounted in said plunger, a spring footed on said plunger urging said check valve onto said seat, a lost motion connection between said plunger and valve stem for unseating said valve and normally holding it unseated, and manually operated means operative to force said plunger inwardly to seat said valve and boost the pressure in the flow line leading to the point of application.

2. An embodiment of the subject-matter defined in claim 1, wherein the lost motion connection consists of a key mounted in the plunger and engaged with an annular groove in the valve stem of a width greater than the thickness of said key.

3. An embodiment of the subject-matter defined in claim 1, wherein the manually operated means consists of a cam rotatably mounted on the casing and engaged with the outer end of the plunger, and a handle for rotating said cam.

4. An embodiment of the subject-matter defined in claim 1, wherein the manually operated means consists of a cam rotatably mounted on one end of the casing and a handle for rotating said cam, said cam having flat surfaces on opposite sides respectively of its periphery adapted to engage with the outer end of the plunger in the extreme positions of throw of said handle, and an involute cam surface between said flat surfaces.

JOHN J. SCHLUMBRECHT.
JOHN C. ALLEN.